Patented Jan. 26, 1932

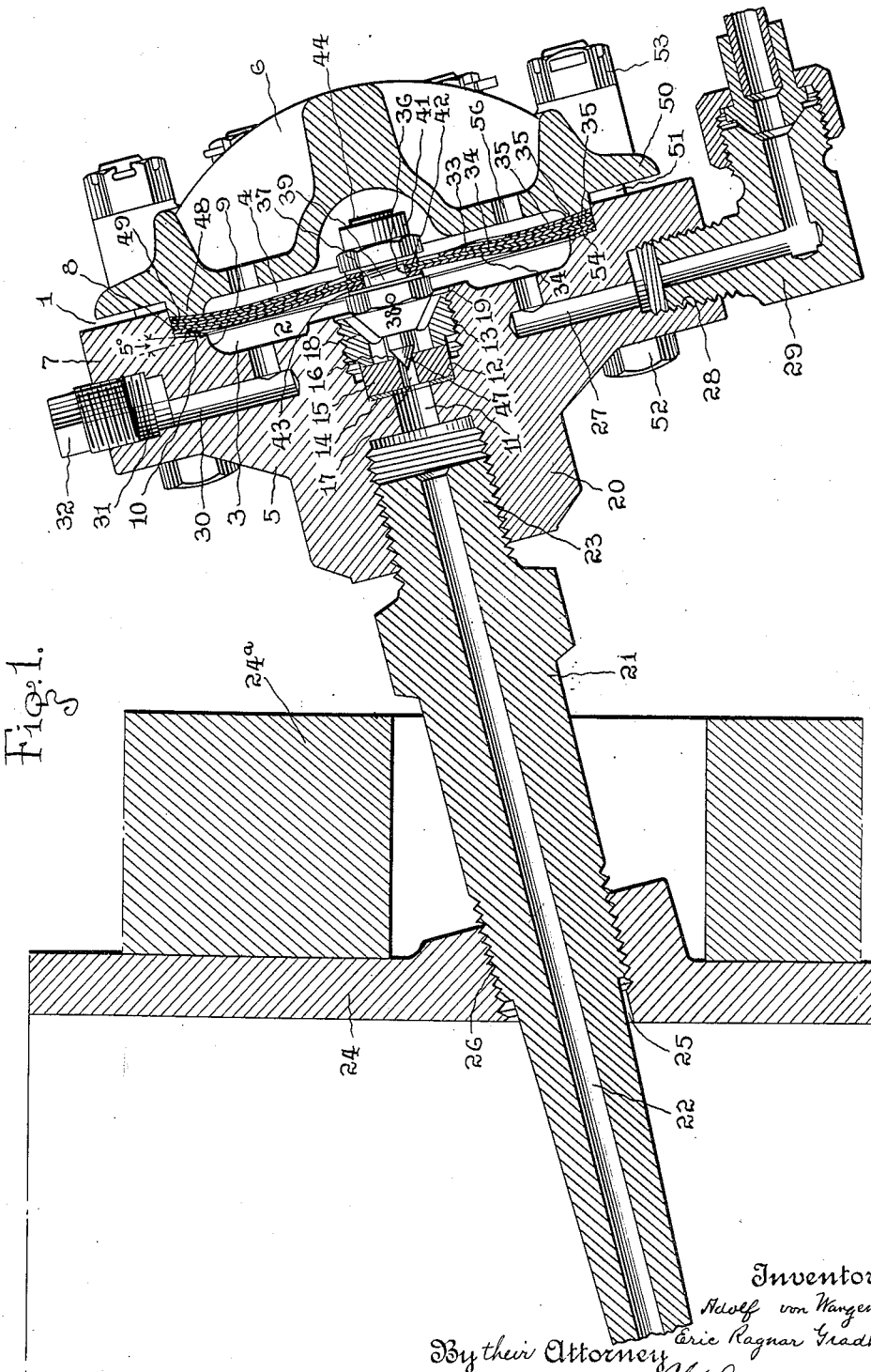

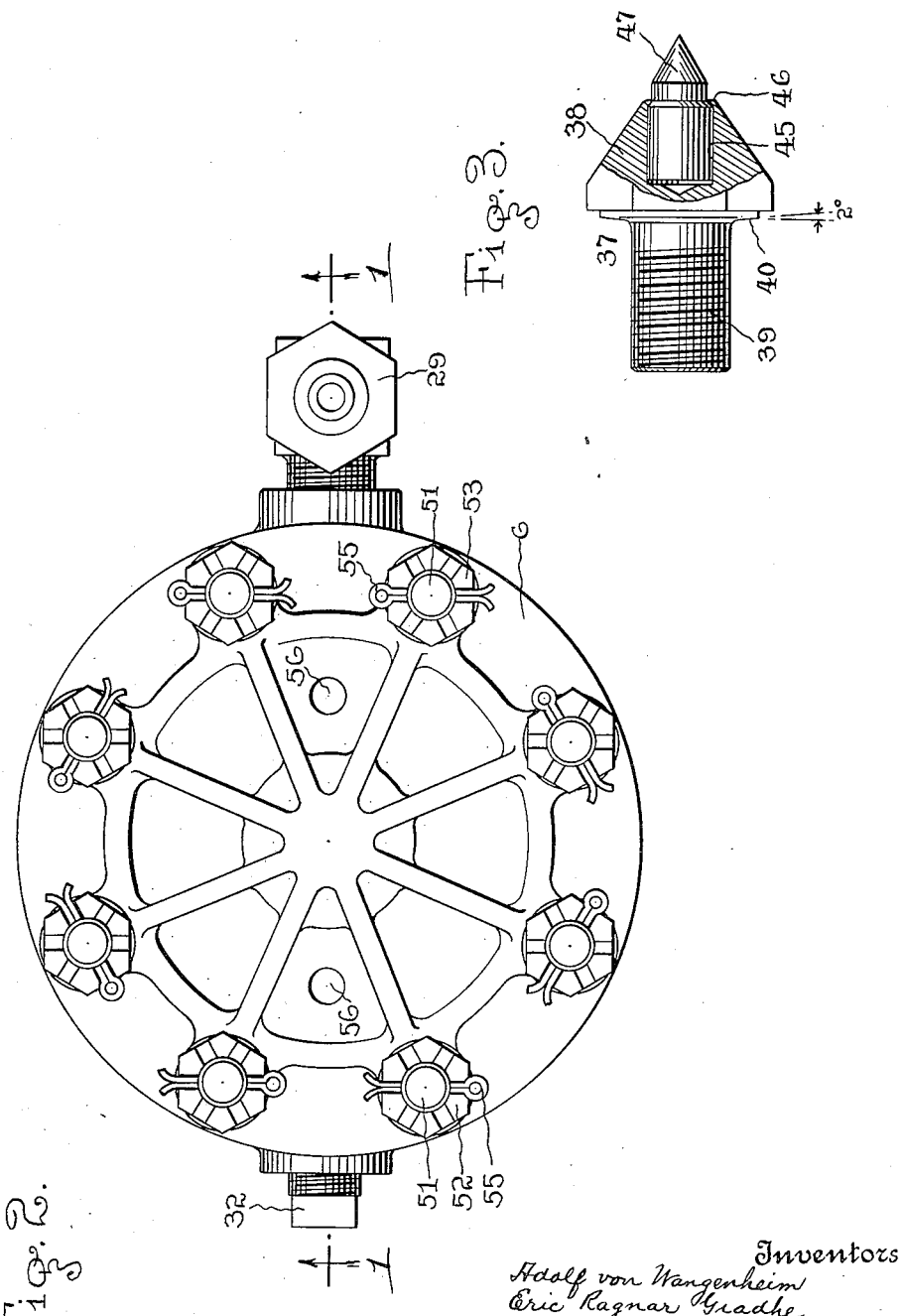

1,843,068

UNITED STATES PATENT OFFICE

ADOLF von WANGENHEIM AND ERIC RAGNAR GRADHE, OF DETROIT, MICHIGAN, ASSIGNORS TO DETROIT LUBRICATOR COMPANY, OF DETROIT, MICHIGAN, A CORPORATION OF MICHIGAN

VALVE

Application filed October 8, 1927. Serial No. 224,823.

Our invention relates to new and useful improvements in valves, and more particularly to a check valve adapted among its various uses to be employed as a terminal check in an oil line of a force feed lubricating system.

An object of our invention is to provide an improved valve of simple construction which is efficient in operation.

Another object is to provide an improved valve which will operate to pass fluid at a predetermined pressure.

The invention consists in the improved construction and combination of parts, to be more fully described hereinafter, and the novelty of which will be particularly pointed out and distinctly claimed.

In the accompanying drawings to be taken as a part of this specification, we have fully and clearly illustrated a preferred embodiment of our invention, and wherein—

Figure 1 is a longitudinal central section of the valve on the line 1—1 of Fig. 2;

Fig. 2 is a top plan view thereof, and

Fig. 3 is a detail.

Referring to the drawings by characters of reference, 1 designates the body member of the valve, which is preferably substantially cylindrical and of hollow construction, having an internal chamber 2 which is formed by recesses 3, 4, respectively, in the base member 5 and the cap member 6 which form said body. Surrounding the recess 3 is an annular flange 7 which is recessed or stepped, as at 8, around its inner face or wall 9 to provide a shoulder 10. Through the base member 5 is an outlet passage 11 which preferably opens at its inner end at the midpoint of the recess 3. The inner end of passage 11 has a socket 12 which is enlarged in diameter and internally threaded, as at 13. Within the socket 12 is a washer 14, preferably of dead soft copper which supports a valve seat member 15, preferably of hardened high speed steel having a valve seat proper 16 which is preferably ground and lapped. The valve seat 15 is annular, having a valve port 17 therethrough in line with passage 11. In order to secure the valve seat member 15 in its socket, we preferably screw an annular, externally threaded sleeve or nut 18 into the enlargement 13 until it seats tightly against the periphery of the member 15 compressing the washer 14, and we then stake the nut 18, as at 19, to prevent its loosening in operation. The outer or other end of passage 11 preferably opens into an internally threaded nipple 20 which may receive a conduit 21 to convey oil or other fluid admitted to passage 11. We have shown the conduit 21 as embodied in a stud having a longitudinal passage 22 therethrough and an externally threaded end 23 for engagement with the nipple 20. The stud passes into a steam pipe 24, through insulation 24ª and a pipe opening 25, in which it is secured by threaded engagement, as at 26. Through the base member 5 is an inlet passage 27 which opens at its inner end into the recess 3, and which is provided with an internally threaded socket 28 at its outer end to receive suitable piping connections 29 which lead to the pressure generator—for example, a force feed pump of a lubricating system, not shown. Also through the base member 5 is a passage 30 having its inner end opening into the recess, and at its outer end having internal threads 31. Passage 30 is normally closed by a screw plug 32, but is adapted to receive a pressure gauge, not shown, for determining the pressure within the chamber 2.

The shoulder 10 of base member 5 converges or is inclined slightly toward the valve seat 16 at an angle of—say, 5 degrees— so that the depth of the step 8 is greater at the inner edge of shoulder 10 than at its outer edge where it joins the flange 7. Supported on this downward, inclined face of shoulder 10, is a resilient, flexible diaphragm 33 which is preferably laminated, having main layers or laminations 34 of any desired number, and a plurality of annular reinforcing laminations or rings 35 which are of increasing internal diameter, the reinforcing ring 35 adjacent main laminations 34 being of smallest internal diameter, and the uppermost ring 35 being of largest internal diameter. The laminations of the diaphragm are preferably chrome vanadium sheet steel. Through the diaphragm 33 is a hole 36 in alinement with the port 17. Positioned within the recess 3 is a valve member 37 having a head 38 from which a stem 39 projects upward, forming a shoulder 40 which inclines slightly upward toward the stem 39 at an angle of about 2 degrees. The stem 39 which is threaded, projects through hole 36 and receives a nut 41. On either side of the diaphragm 33 and interposed respectively between the head 38 and the nut 41, are washers 42, 43, preferably of dead soft copper. When nut 41 has been tightened down on stem 39 it will flex the diaphragm downward around the head 38, compressing the washers 42, 43 to seal the opening 36 around stem 39. The stem 39 is then staked, as at 44, to secure the nut 41 tightly on the stem. The underside of the valve member 37 has a cylindrical recess or socket 45 in the longitudinal center line of the member. In this socket 45 is seated and secured, as at 46, by burnishing, or the like, a valve proper 47, preferably of the needle type, and preferably of hardened high speed steel of hardness greater than member 15. The head 38 of member 37 is preferably of softer material than the needle 47, so that possibility of the stem 39 breaking, due to sudden stresses upon seating of said valve, will be obviated, as might be the case if the head 38 and the needle 47 were made of one piece of hardened material. When the valve is on its seat, the shoulder 40 will lie in a plane above the plane of the shoulder 10.

The cap member 6 is provided on its underside with an annular flange 48 which surrounds its recess 4. The flange 48 fits into the recess 8 of the base member 5 and is supported on the diaphragm 33 above the shoulder 10. The diaphragm-engaging face 49 of flange 48 is inclined at substantially 5 degrees to lie parallel to shoulder 10. Around the cap member 6 is a laterally projecting flange 50 which overlies flange 7, and through the flanges 50 and 7 are bolt holes to receive bolts 51 having heads 52 which abut the base member 5 and receive nuts 53 which abut cap member 6. When the nuts 53 are tightened down, they clamp flange 48 and shoulder 10 together upon the periphery of diaphragm 33, and due to the inclination of the faces of the shoulder 10 and flange 48, the diaphragm is flexed downward along its periphery, but is reversely flexed at its middle due to the height of shoulder 40 above the valve seat proper 16 and to the inclination of the shoulder 40. The diaphragm will therefore be convex downward adjacent its periphery, and concave downward at its center out of its neutral position or plane, so that the resilient diaphragm, due to its internal stresses so set up, will exert a positive downward force on shoulder 40 variable with the number of annular laminæ 35 to press the valve 47 against its seat 16. The normal pressure of the valve on its seat may be regulated by inserting shims 54 between the diaphragm 33 and the shoulder 10. The nuts 53 are secured against loosening by any well known means, such as cotter-pins 55. Suitable holes 56 are provided in cap member 6 above the diaphragms so that in the event a leakage develops from chamber 2 into recess 4, the liquid pressure in recess 4 will not hold valve 47 upon seat 16 with sufficient force to permit damage to be done either to the pressure generator or to this device due to excessive pressure.

Operation of the valve is as follows: The valve is first set, under test, to open at a predetermined pressure acting against diaphragm 33, as determined by a gauge connected to passage 30. The operating pressure may be regulated by the number of laminations 34, 35 and the thickness of the shims 54 which are used. The valve having been set and the passage 30 closed by plug 32, the valve is then installed by means of the stud 21, for example, in a force feed lubrication system where the back steam pressure or the pressure backing up through outlet passage 11 will not exceed the predetermined pressure at which the valve will open. The inlet 27 is then connected to a pressure generator by piping 29. When the pressure exerted within recess 3 by the lubricant against diaphragm 33 is sufficient to raise the diaphragm which carries with it the valve 46, then the lubricant will be admitted through port 17 to the steam line 24, and due to the higher pressure in the oil line necessary to open the valve 46, no steam can escape into chamber 2.

By the construction shown and described, a valve is provided which is particularly adapted for use in a force feed lubrication system where the outlet or feed of lubricant is directed into a steam line or chamber containing steam under pressure, and which valve will remain normally closed against back pressure of the steam whenever the pressure of oil in the feed line from the feed pump drops from any reason. It will also be seen that a predetermined pressure in the oil line while the pump is operating will act on the diaphragm to open the valve and will hold it open as long as such predetermined pressure is maintained.

By inclining the seats 10 and 40 of the diaphragm, as above described, we are enabled to distribute the stresses and resultant deflections in the laminated diaphragm over the entire area of the diaphragm which is under pressure, thereby avoiding deflection of the diaphragm solely at the points of support which might be liable to cause fracture of the discs comprising the diaphragm.

Although we have described the valve as operating in a lubricating system, it is obvious that it is adapted for other uses in which it is desired to feed fluid at predetermined pressures or against known pressures.

What we claim and desire to secure by Letters Patent of the United States is:—

1. A check valve of the character described, comprising a hollow body member having an inlet and an outlet, said outlet having a valve seat, a resilient diaphragm in said hollow body member, a valve fixed to said diaphragm and normally engaging said seat to close said outlet, and clamping means to seal said diaphragm in said body member, said means setting up internal stresses in said diaphragm normally pressing said valve against its seat.

2. A check valve of the character described, comprising a body member having a chamber therein, said chamber having an inlet and an outlet, a valve normally closing said outlet, a diaphragm seat within said chamber, said seat being inclined toward said outlet, and a resilient diaphragm carrying said valve and clamped against said seat and flexed thereby against said valve whereby said valve is forced to its seat by the resilience of said diaphragm.

3. A check valve of the character described, comprising a body member having a chamber therein, said chamber having an inlet and an outlet, a valve normally closing said outlet, a diaphragm seat within said chamber, said seat being inclined toward said outlet, a shoulder on said valve above the plane of said diaphragm seat, and a resilient diaphragm clamped against said seat and said shoulder whereby said diaphragm is curved convexly downward adjacent its periphery and concavely downward adjacent its center.

4. A check valve of the character described, comprising a hollow body member having a base member and a cap member, said base member having an internal surrounding shoulder, said cap member having a flange cooperating with said shoulder, a diaphragm within said body member having reenforcing annular members of increasing internal diameters, said diaphragm and members having their marginal edges between said shoulder and said flange, means to force said flange toward said shoulder to seal said diaphragm and members in said body member, a passage through said base member, and a valve carried by said diaphragm to close said passage.

5. A check valve of the character described, comprising a hollow body member having a base member and a cap member, said base member having an internal surrounding shoulder, said cap member having a flange cooperating with said shoulder, a resilient diaphragm within said body member having its marginal edge between said shoulder and said flange, means to force said flange toward said shoulder to seal said diaphragm in said body member, a passage through said base member, a valve normally closing said passage, and means adjacent the marginal edge of and acting on said diaphragm to hold said diaphragm under compression against said valve, whereby said valve is held in closed position by the expansive force of said diaphragm.

6. A check valve of the character described, comprising a body member having a chamber therein, a passage from said chamber, said passage having a valve seat member secured therein, a valve normally engaging said seat member to close said passage, a resilient metal diaphragm sealing said chamber and held under compression against said valve by engagement between said diaphragm and said body member whereby said diaphragm acts to hold said valve on its seat against pressure in said first-named passage, and an inlet passage opening into said chamber beneath said diaphragm whereby predetermined pressure in said inlet passage will act on said diaphragm to open said valve.

7. A check valve of the character described, comprising a body member having a chamber therein, a passage to said chamber having a valve seat, a valve normally engaging said seat to close said passage, a laminated resilient diaphragm sealing said chamber and held under compression against said valve by engagement between said diaphragm and said body member whereby the internal stresses set up in said diaphragm by the compression thereof act to hold said valve on its seat.

8. A check valve of the character described, comprising a body member having a chamber therein, a passage to said chamber having a valve seat, a valve normally engaging said seat to close said passage, a laminated resilient diaphragm sealing said chamber and having a reinforcing annulus and held under compression against said valve by engagement between said diaphragm and said body member whereby the internal stresses set up in said diaphragm by the compression thereof act to hold said valve on its seat.

9. A check valve of the character described, comprising a body member having a chamber therein, a plurality of passages through said body member into said chamber, one of said passages having a valve seat, a diaphragm seat in said chamber inclined to and surrounding said valve seat and spaced laterally and axially therefrom, a resilient diaphragm sealed and clamped at its marginal edge to said diaphragm seat whereby said diaphragm is bent convexly downward out of its neutral position, a valve normally engaging said valve seat, and a shoulder on said valve engaging and compressing said diaphragm whereby said diaphragm acts to press said valve against its seat.

10. A check valve of the character described, comprising a body member having a recess forming a surrounding flange, a passage through said body concentric with said flange and opening into said recess, said passage having a valve seat, said flange having a diaphragm seat inclined toward said valve seat, a diaphragm having its marginal edge supported on and sealed to said diaphragm seat whereby said diaphragm is flexed toward said passage, and a valve engaging said valve seat and engaging and compressing said diaphragm whereby said diaphragm acts to press said valve against its seat.

11. A check valve of the character described, comprising a body member having a recess forming a surrounding flange, a passage through said body concentric with said flange and opening into said recess, said passage having a valve seat, said flange having a diaphragm seat inclined toward said valve seat, a diaphragm having its marginal edge supported on and sealed to said diaphragm seat whereby said diaphragm is flexed toward said passage, said diaphragm being laminated, and a valve engaging said valve seat and engaging and compressing said diaphragm whereby said diaphragm acts to press said valve against its seat.

12. A check valve of the character described, comprising a body member having a recess forming a surrounding flange, a passage through said body concentric with said flange and opening into said recess, said passage having a valve seat, said flange having a diaphragm seat inclined toward said valve seat, a diaphragm having its marginal edge supported on and sealed to said diaphragm seat, said diaphragm being laminated and having a reinforcing annulus, and a valve engaging said valve seat and engaging and compressing said diaphragm whereby said diaphragm acts to press said valve against its seat.

13. A check valve of the character described, comprising a body member having a recess forming a surrounding flange, a passage through said body concentric with said flange and opening into said recess, said passage having a valve seat, said flange having a diaphragm seat inclined toward said valve seat, a diaphragm having its marginal edge supported on and sealed to said diaphragm seat, said diaphragm being laminated and having superposed reinforcing annui of increasing internal diameters, and a valve carried by said diaphragm for cooperation with said valve seat.

14. A check valve of the character described, comprising a body member having a chamber therein, a passage to said chamber, a socket providing an inwardly facing shoulder at the chamber end of said passage, a valve seat member within said socket and of harder material than said body member and abutting said shoulder, means engaging and forcing said valve seat member against said shoulder, a diaphragm sealed at its marginal edge within said chamber, and a valve carried by said diaphragm for cooperation with said seat member.

15. A check valve of the character described, comprising a hollow body member having a base member and a cap member, said base member having an annular flange, an annular seat within said flange, said cap having an annular flange for cooperation with said seat, said base member having a central passage therethrough, the opposing faces of said seat and the flange on said cap being substantially parallel and inclined toward said passage, a diaphragm bent out of neutral position by engagement of its marginal edge between said seat and the flange on said cap whereby said diaphragm is flexed toward said passage, and a valve carried by said flexed diaphragm normally closing said passage.

16. A check valve of the character described, comprising a hollow body member having a base member and a cap member, said base member having an annular flange, an annular seat within said flange, said cap having an annular flange for cooperation with said seat, said base member having a central passage therethrough, the opposing faces of said seat and the flange on said cap being substantially parallel and inclined toward said passage, a laminated diaphragm having its marginal edge supported by said seat and sealed thereto by the flange on said cap whereby said diaphragm is normally flexed toward said passage, said passage having a socket at its inner end, a valve seat member within said socket of harder material than said body member, and a valve carried by said diaphragm for cooperation with said valve seat member to open and close said passage.

17. A check valve of the character described, comprising a hollow body member having an inlet and an outlet, said outlet having a valve seat, a flexible resilient diaphragm sealed in said hollow body member, a valve carried by said diaphragm and normally engaging said seat to close said outlet, and means bearing on said diaphragm adjacent its periphery to hold said diaphragm under compression against said valve whereby the expansive force of said diaphragm acts to press said valve against its seat.

18. A diaphragm support comprising a plurality of substantially concentric seats, and a resilient diaphragm clamped to said seats, one of said seats being axially movable relative to another of said seats, said seats each being inclined whereby the stresses and resultant deflections in said diaphragm are distributed over the entire area of said diaphragm upon movement of said movable seat.

19. A valve comprising a valve body having a valve seat of material harder than said body, a needle valve of material harder than said seat adapted to cooperate with said seat, and a valve stem secured to said valve and of less hardness than said valve whereby the possibility of said stem breaking due to sudden stresses on seating of said valve will be obviated.

In testimony whereof we have hereunto signed our names.

ADOLF von WANGENHEIM.
ERIC RAGNAR GRADHE.